United States Patent
Jesuraj (10) Patent No.: US 8,572,281 B1
(45) Date of Patent: Oct. 29, 2013

(54) LEAKING ROUTES AMONG ROUTING ENGINES IN A HIGHLY SCALABLE ROUTER

(75) Inventor: Ramasamy Jesuraj, Westford, MA (US)

(73) Assignee: Ciena Corporation, Hanover, MD (US)

( * ) Notice: Subject to any disclaimer, the term of this patent is extended or adjusted under 35 U.S.C. 154(b) by 1366 days.

(21) Appl. No.: 11/388,492

(22) Filed: Mar. 24, 2006

(51) Int. Cl.
*G06F 15/173* (2006.01)

(52) U.S. Cl.
USPC .......................... 709/238; 709/242; 709/244

(58) Field of Classification Search
USPC ................ 709/238, 243, 239, 240, 242, 244; 370/400, 401, 351, 389, 396
See application file for complete search history.

(56) References Cited

U.S. PATENT DOCUMENTS

| | | | | |
|---|---|---|---|---|
| 6,047,330 | A * | 4/2000 | Stracke, Jr. | 709/238 |
| 7,120,682 | B1 * | 10/2006 | Salama | 709/222 |
| 7,281,039 | B1 * | 10/2007 | Salkewicz | 709/223 |
| 7,318,108 | B2 * | 1/2008 | Sreekantiah et al. | 709/242 |
| 7,334,047 | B1 * | 2/2008 | Pillay-Esnault | 709/242 |
| 7,529,257 | B1 * | 5/2009 | Tappan | 370/409 |
| 7,554,996 | B2 * | 6/2009 | Previdi et al. | 370/401 |
| 7,760,701 | B2 * | 7/2010 | Levy-Abegnoli et al. | 370/351 |
| 2003/0009585 | A1 * | 1/2003 | Antoine et al. | 709/238 |
| 2007/0140235 | A1 * | 6/2007 | Aysan et al. | 370/389 |
| 2007/0250642 | A1 * | 10/2007 | Thubert et al. | 709/245 |

OTHER PUBLICATIONS

Metz, C., "At the core of IP networks: link-state routing protocols"; Internet Computing, IEEE vol. 3, Issue 5, Sep.-Oct. 1999 pp. 72-77/ [retreived from IEEE database on Jul. 21, 2009].*

Govindan, R.; Reddy, A.;"An analysis of Internet inter-domain topology and route stability";INFOCOM '97. Sixteenth Annual Joint Conference of the IEEE Computer and Communications Societies. Proceedings IEEE. Apr. 7-12, 1997. 850-857 vol. 2 [retrieved from IEEE database on Jan. 11, 2011].*

Feamster, Nick; Balakrishnan, Hari; "Verifying the Correctness of Wide-Area Internet Routing", Massachusetts Institute of Technology Computer Science and Artificial Intelligence Laboratory. May 17, 2004. [retrievedon Feb. 12, 2012 from "http://hdl.handle.net/1721.1/30471"].*

Govindan, R., Alaettinoglu, C., Varadhan, K., Estrin, D. "Route servers for inter-domain routing". Computer Networks and ISDN Systems 30 (1998), pp. 1157-1174. [retrieved from ACM database on Oct. 22, 2012].*

Feamster, Nick, and Hari Balakrishnan. "Verifying the correctness of wide-area Internet routing." (2004). [retrieved from Internet Jun. 7, 2103].* Wong, Tina, Van Jacobson, and Cengiz Alaettinoglu. "Internet routing anomaly detection and visualization." In Dependable Systems and Networks, 2005. DSN 2005. Proceedings. International Conference on, pp. 172-181. IEEE, 2005. [retrieved from IEEE database on Jun. 7, 2013].*

* cited by examiner

*Primary Examiner* — Saleh Najjar
*Assistant Examiner* — Lashanya Nash
(74) *Attorney, Agent, or Firm* — Muncy, Geissler, Olds & Lowe, PLLC (57) ABSTRACT

A method and system for leaking routes between routing engines in a communication network. The method and system includes a route distribution service that receives and stores routing information from one or more exporting routers. The stored routing information includes the identity of one or more shared routes and may also include related route exportation criteria such as restrictions on which importing routers may receive shared routes. The route distribution service receives from one or more importing routers a request for one or more shared routes and provides one or more shared routes to the importing router. Importing routers can register with the service in order to receive shared routes or be notified when shared routes become available.

18 Claims, 5 Drawing Sheets

LEAKING ROUTES AMONG ROUTING ENGINES IN A HIGHLY SCALABLE ROUTER

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Statement of the Technical Field

The present invention relates to the field of networking communications and, more particularly, to a method and system for leaking routes among routing engines via use of a routing distribution database.

2. Description of the Related Art

As will be apparent to one of ordinary skill in the art, communication networks include a number of network devices or nodes, which are connected via links or communication paths. One well known type of communication network is a packet network. A device for managing the flow of packets in a network is commonly known as a router. Routing is the act of moving information across a network from a source node to a destination node.

Routing and routing protocols involve two basic activities: determining optimal routing paths and transporting information groups, i.e., packets, through a network. Routing protocols use routing algorithms to determine the optimal path that the packet should travel to reach its destination. To aid the process of path determination, routing algorithms initialize and maintain routing tables which contain route information. Route information varies depending on the routing algorithm used. The router creates or maintains a table of the available routes and their conditions, and uses this information, along with distance and cost algorithms, to determine the best route for a given packet.

In highly scaleable networking devices, it is often desired to run multiple routing engines, where each engine services its own routing domain having its own addressing space. Each routing engine has its own set of routing protocol and policy configuration. Each engine's route selection is independent from one another. However, it is sometimes necessary to share or "leak" certain routes among routing engines. For example, one routing engine (e.g., Engine A) may service a Virtual Private Network (VPN) and another routing engine (e.g., Engine B) may service the public Internet. If a VPN user needs to access the Internet through Engine A, it is necessary to have the appropriate public interest (i.e., Internet) routes leaked from Engine B to Engine A.

A current method of leaking routes is to add an interface that connects the two routing engines and then run a dynamic routing protocol between the two engines over that connection. The interface could be a physical or a virtual interface. By applying appropriate routing filter, one or more selected routes can be exported and imported between routing engines. There are, however, drawbacks associated with leaking routes between routing engines by using a dynamic routing protocol.

Dynamic routing allows routing tables in routers to change as the possible routes change. A well known way of routing information between routers using Interior Gateway Protocol (IGP) for the specific case of dynamic routing is known as Routing Information Protocol (RIP). RIP obtains routing information for all possible routes in a network. RIP periodically broadcasts its routing table to neighboring routers. It sends requests to other routers for their routing tables and, as each router sends its routing tables, routes are calculated. However, networks utilizing RIP require a long time to stabilize after a router or a link fails, and require a great deal of bandwidth and overhead due to the constant broadcasting of messages and the repeated provision of route updates.

An example of the difficulty associated with the use of dynamic routing protocols to leak routes among routing engines is running a Border Gateway Protocol (BGP) on the interface. BGP uses Transmission Control Protocol (TCP) as a transport protocol. When two systems are using BGP, they establish a TCP connection and then send their BGP routing tables to each other. BGP detects failures by sending periodic "keep alive" or "hello" messages to its neighbors every 30 seconds. It exchanges information about reachable networks with other BGP systems, including the full path of systems that are between them. Thus, if there are N number of routing engines, and each engine needs to leak routes to each other engine, then there are $N^2$ such interfaces that are needed. Therefore, the overhead increases drastically with the number of engines in the network. Obviously, this approach does not scale well when used for leaking routes among routing engines.

Figure 1:
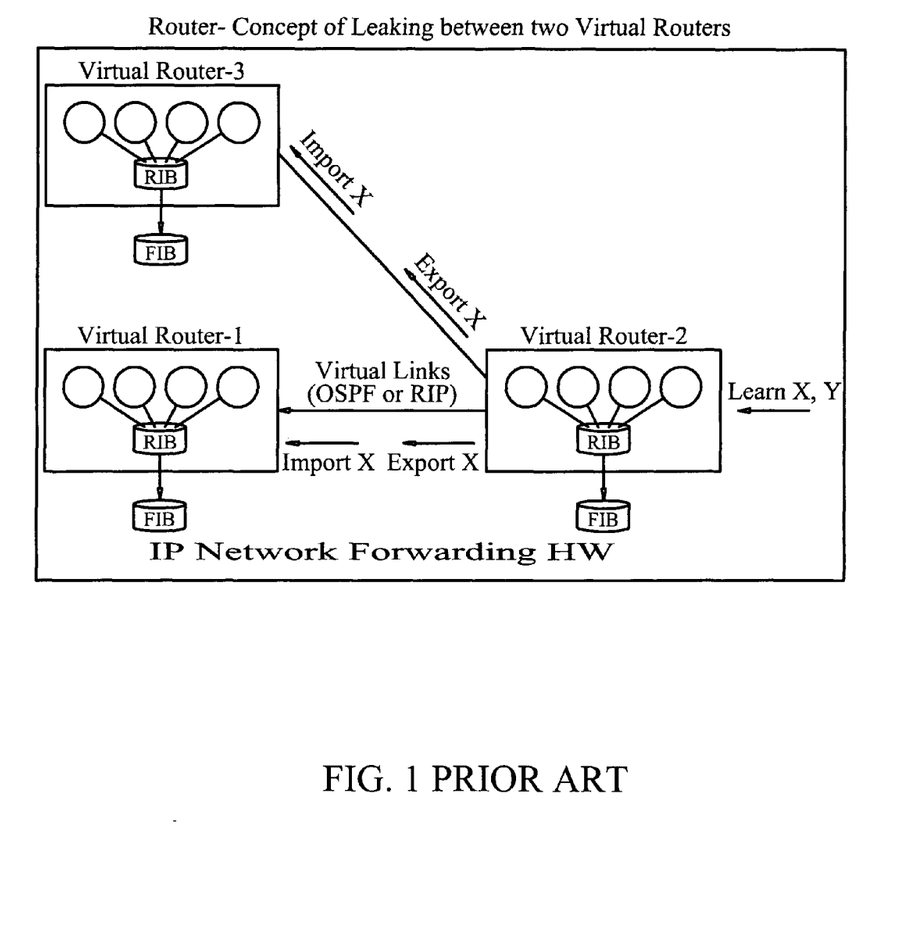
FIG. 1 is a is a block diagram illustrating a traditional method of importing and exporting routing policies among multiple virtual routers.

FIG. 1 represents a traditional way of leaking routes between two or more virtual routers. A classical approach that is often taken to leak routes between two or more virtual routers is to create a virtual link between the routers as shown in FIG. 1. In this example, virtual router-2 establishes a virtual link with virtual router-1, and establishes an IGP routing protocol, such as OSPF or RIP, over this link. The IGP for virtual router-2 uses its routing export protocols to export routes X that are to be leaked to router-1. Virtual router-1 uses its import routing protocols to add the exported routes X to a Routing Information Base (RIB).

Similarly, virtual router-2 can export routes X to router-3 over a virtual link between the two routers. Again, router-2 uses its export procedures to leak routes X over the virtual link to router-3. Virtual router-3 uses its route import procedures to add routes X to its RIB. Even though this approach capitalizes on the existing IGP infrastructure, the cost of leaking routes grows exponentially as the number of virtual routers sharing these routes increases. For example, if a virtual router shares routes with N other virtual routers, then it must create N virtual links and run IGP on each of those N links. Further, the exporting router needs to configure and execute routing export/import polices on each of these links for that IGP.

Creating virtual links also consumes memory resources and running IGP on those virtual links consumes memory as well as CPU resources. Executing routing polices also requires CPU resources. Thus, in the classical approach for leaking routes, the requirements on memory and CPU resources grows exponentially with the number of virtual routers. The approach illustrated in FIG. 1 requires each virtual link to be maintained, and because each virtual interface includes its own inherent overhead, adding virtual links to leak routes in this fashion is cumbersome, costly and expensive. The overhead increases drastically with the addition of each new virtual link.

Therefore, what is needed is an improved system and method for leaking routes between routing engines that resolves the scalability issue by requiring significantly less overhead and resources.

SUMMARY OF THE INVENTION

The invention describes an apparatus and method which advantageously allows routers to share routes with other routers in a communication network via a routing distribution service, thereby eliminating the need for establishing virtual interfaces between exporting and importing router(s).

According to one aspect of the invention, a method for leaking routes among routers in a communication network is provided. The method includes receiving routing information from one or more exporting routers, where the routing information includes one or more routes to be shared, storing the routing information in a database, receiving from one or more importing routers a request for one or more shared routes, and providing one or more shared routes to the one or more importing routers.

According to another aspect, the present invention provides a system for leaking routes among routers in a communication network. The system includes a route distribution service that receives routing information from one or more exporting routers. The routing information includes at least the identity of one or more shared routes, and may also include route exportation criteria. These criteria include policies that restrict the ability of certain importing routers to receive exported routes. The system also includes a database for storing the routing information. The route distribution service receives a request for one or more shared routes from one or more importing routers, and provides one or more shared routes to the importing router.

In yet another aspect, the present invention provides a storage medium storing a computer program which, when executed by a processing unit, performs a method for leaking routes among routers in a communication network. The method is includes receiving routing information from one or more exporting routers where the routing information includes one or more routes to be shared, storing the routing information in a database, receiving from one or more importing routers a request for one or more shared routes and, providing one or more shared routes to the one or more importing routers.

Additional aspects of the invention will be set forth in part in the description which follows and, in part, will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated into and constitute a part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 2:
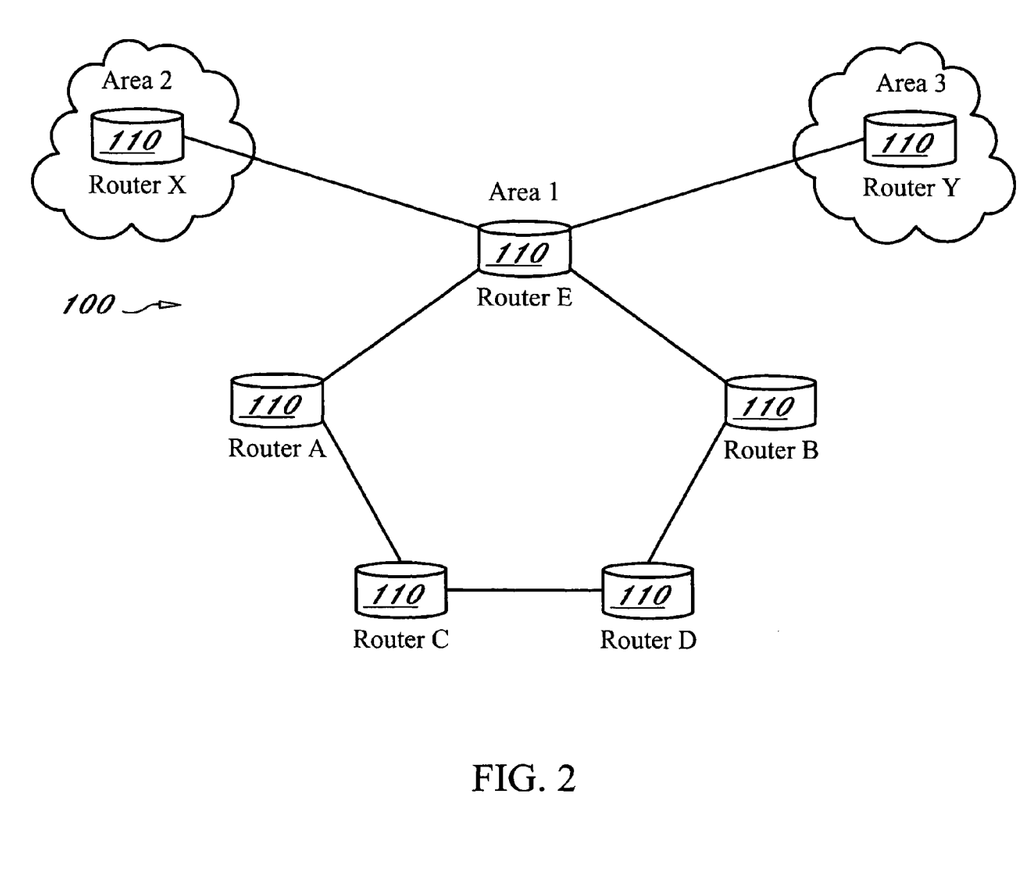
FIG. 2 is a block diagram of a communication network incorporating the present invention.

Referring now to the drawing figures in which like reference designators refer to like elements, there is shown in FIG. 2, a system constructed in accordance with the principles of the present invention. FIG. 2 illustrates a number of routers 110 within a communication network 100. Each area represents a unique routing domain. For example, Areas 2 and 3 may represent virtual private networks, while Area 1 may represent the public Internet. Routers 110 typically route information packets to other routers 110 located only within their same area. Further, since these routers 110 typically route information to other routers within their routing domain, there is no need for the routers 110 to store routing protocols of other routers 110 not located in their area.

However, there are times when a user in one area, for example, one of the virtual private networks (Areas 2 and 3 in FIG. 2), may need to access another area, for example, the Internet (Area 1, in FIG. 2). In this instance, it is necessary to have the appropriate Internet routes from Area 1 exported or "leaked" to Areas 2 and 3. Conversely, it is sometimes necessary for routing protocols containing routing information in Areas 2 and 3 to be leaked to routers 110 in Area 1. Rather than providing a physical or virtual interface between routers 110 in each area and running a dynamic routing protocol over this interface, the present invention employs highly scalable routers 110 that reduce the overhead associated with running dynamic protocols.

Figure 3:
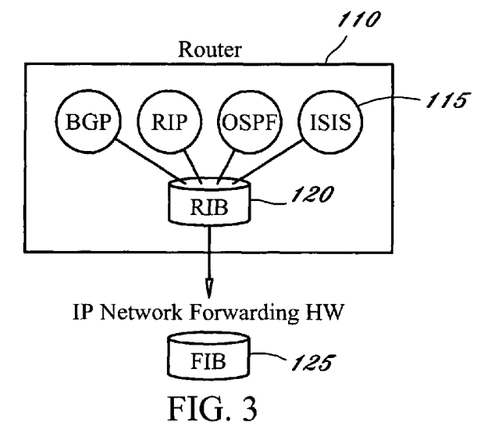
FIG. 3 is a block diagram of a router incorporating the present invention.

Referring to FIG. 3, a block diagram of a router 110 utilizing the present invention is illustrated. Although the term "router" is used herein to refer to the network element used to transport data and/or routing information within and between autonomous systems, it is readily understood by one of ordinary skill in the art that the present invention is not limited to such. Accordingly, the term "router" as used herein, can refer to any switching network element, such as a switch, router or any other computing device, such that the present invention is not limited to the use of routers in the traditional sense. Put another way, the term "router" is used merely for convenience herein and is not intended to limit the present invention to only traditional routing platforms.

Routers 110 include suitable hardware and software to enable them to perform the functions described herein with respect to the present invention. For example, routers 110 include a central processing unit, volatile and non-volatile memory and storage devices, network interfaces and processors, as well as other I/O interfaces to enable configuration.

Router 110 stores a variety of routing protocols 115, which are used to route information packets throughout network 100. Each router 110 in network 100 learns various routes by using these routing protocols. The routes learned through protocols are stored in a Routing Information Base (RIB) 120. A variety of exemplary routing protocols 115 are illustrated in FIG. 3. These can include but are not limited to, Routing Information Protocol (RIP), Border Gateway Protocol (BGP), Open Shortest Path First (OSPF), and Intermediate System-to-Intermediate System (ISIS). Based on various configured policies and algorithms, router 110 selects the best route for each known destination and installs these routes in a Forwarding Information Database (FIB) 125. Network 100 then utilizes network forwarding hardware to forward information packets to their destinations based upon the route entries stored in FIB 125.

Each router 110 can support more than one routing context. A routing context is a logical construct within a virtual router, with its own management domain, IP address space, and routing protocols. Each context is independent of other contexts within the same router. Each routing context has its own configuration of routing protocols and policies for learning routes.

Figure 4:
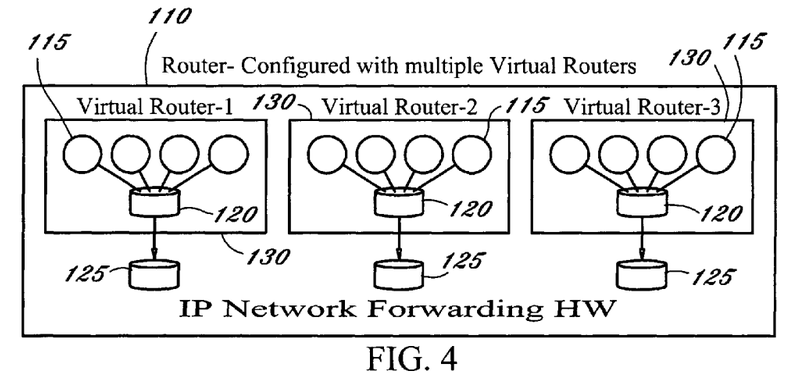
FIG. 4 is a block diagram of a router configured with multiple routing contexts.

Referring to FIG. 4, router 110 is configured with multiple routing contexts, i.e., virtual routers 130. Each virtual router 130 includes its own routing protocols 115, RIBs 120, and FIBs 125. Information residing within RIB 120 and FIB 125 may, or may not, reside in the same physical memory location. If they do reside in the same physical memory location, they are logically isolated so that the routing and forwarding contexts are handled as separate and independent entities. The IP address space used by each virtual router 130 can overlap each other without difficulty. Further, each virtual router 130 may want to share certain routes among themselves. Since each virtual router 130 has its own routing table, the routes are shared by leaking the routes from one virtual router 130 to another. Each receiving router 130 validates the received routes and stores them in its own RIB 120.

Figure 5:
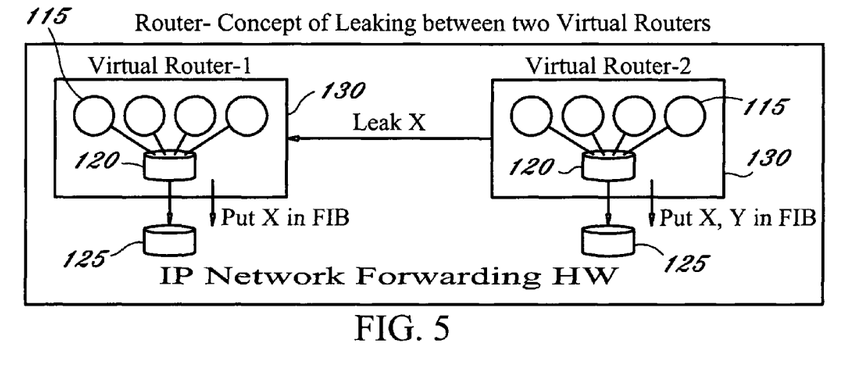
FIG. 5 is a block diagram illustrating the concept of leaking routes among two virtual routers.

FIG. 5 illustrates the importance of leaking routes using the virtual router scenario discussed above and illustrated in FIG. 4. In this illustrative example, virtual router-1 services a private corporate network, and virtual router-2 services a public Internet domain. In this example, the RIB 120 for virtual router-2 contains a listing of routes to the Internet, for example, route lists X and Y. Based on routing protocols 115 stored in RIB 120, the most feasible routes are chosen and stored in FIB 125, and used by the network forwarding hardware to forward IP packets throughout network 100, along the selected routes.

To access the Internet from the corporate network, it is necessary to leak those Internet routes X from virtual router-2 to virtual router-1 as shown in FIG. 5. Without leaking routes X from virtual router-2 to virtual router-1, users in the corporate network cannot access the Internet. To accomplish this, routes X are exported by virtual router-2 and imported by virtual router-1, where they are stored in the RIB 120 of router-1. Using the routing protocols 115 of virtual router-1, the best routes X are stored in FIB 125 and used to forward packets to routes within the Internet domain.

Figure 6:
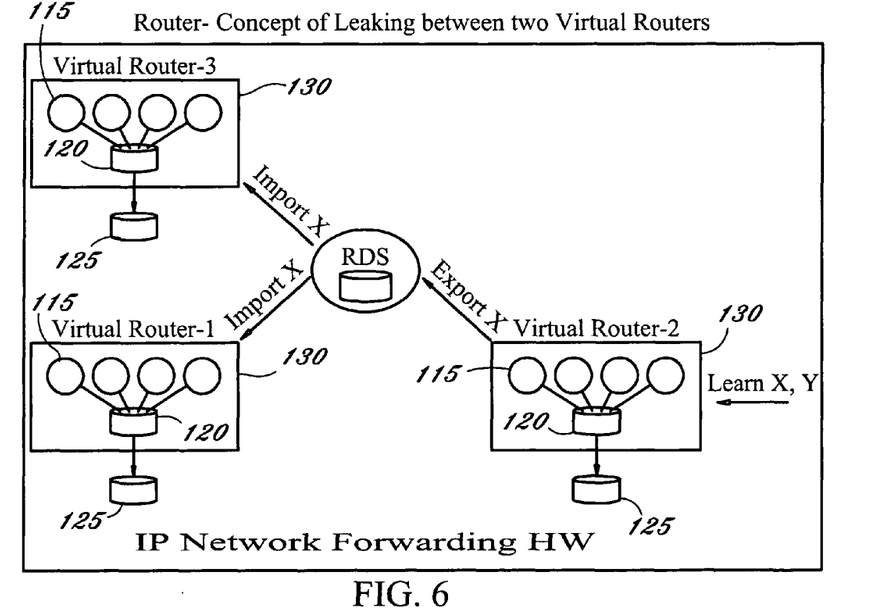
FIG. 6 is a block diagram illustrating the use of the routing distribution service of the present invention.

FIG. 6 illustrates a method and system of leaking routes from one router to one or more other routers that includes a Route Distribution Service (RDS) 135. RDS 135 is a common service that is available to each router 110 in network 100. Each virtual router 130 that wishes to share routes with other routers 130 becomes a client to this service 135. A virtual router 130 that wishes to share its routes, for example, routes X, exports these routes to RDS 135, where they are stored in an RDS database. The virtual routers 130 that wish to receive routes X, import these routes from RDS 135.

When exporting routes, a virtual router 130 may also export other relevant information along with the routes. For example, along with a list of routes, a list or group of available routers 130 is also provided. This list includes routers 130 that are permitted to receive the exported routes. Thus, a router 130 can provide policies that identify which other routers 130 in network 100 are permitted to receive the exported routes. RDS 135 stores the list of exported routes, along with any related information, i.e., lists of routers allowed to receive routes, restriction policies, etc.

The importing virtual routers 130 (virtual router-1 and virtual router-3) can register with RDS 135 for specific routes from specific virtual routers 130. RDS 135 will notify the importing virtual routers 130 when the routes that satisfy the importing routers' specifications become available. The RDS 135 database can also be queried on demand providing virtual routers 130 access to the data on demand. This approach eliminates the need for virtual links, as well as the IGP over those links, and does not increase overheard appreciably as the number of virtual routers 130 increases.

Figure 7:
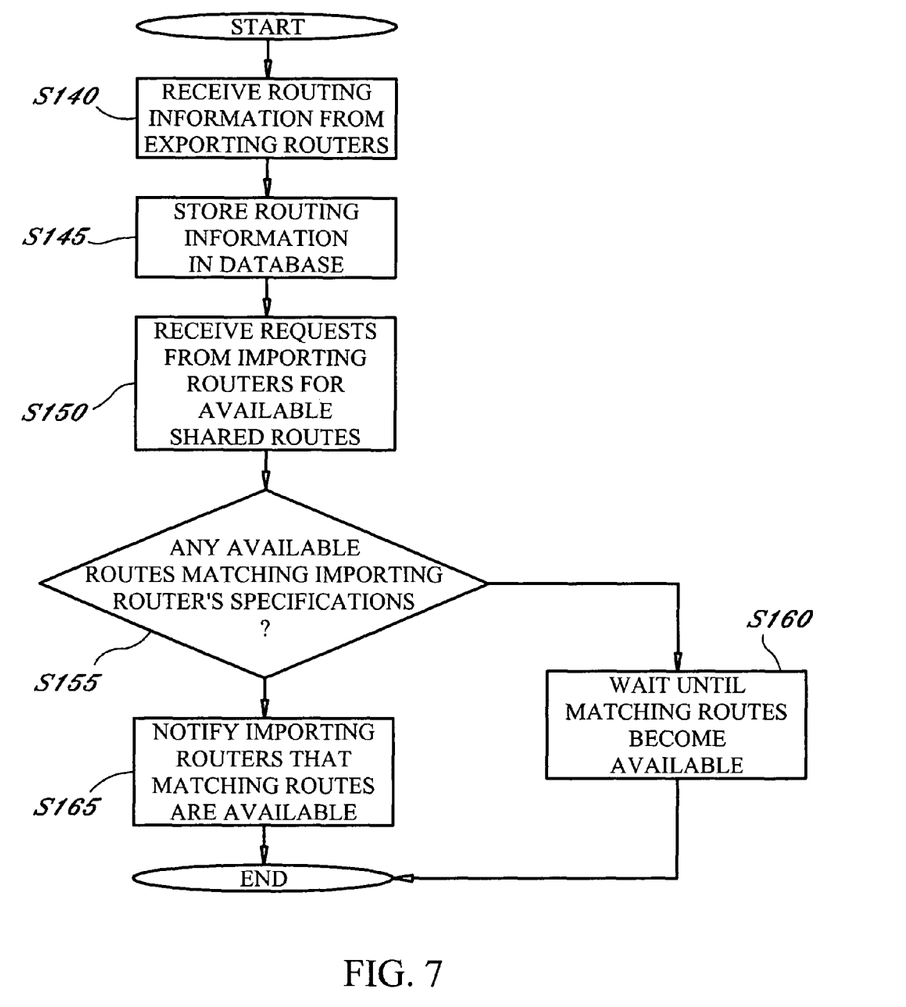
FIG. 7 is a flow chart illustrating the overall process flow of the present invention.

FIG. 7 illustrates the overall flow of the present invention, from the point of view of RDS 135. RDS 135 receives routing information from one or more exporting routers, at step S140. The routing information includes at least the identity of one or more routes that are to be shared with other routers in the network. Along with the identity of these routes, the routing information may also include the identity of specific routers that are allowed to receive shared routes and/or the identity of routers that are not permitted to import shared routes. The routing information from the exporting routers is stored in a database via step S145. It should be noted that the database need not be physically within RDS 135, but may be at a remote location, provided its contents can be accessed by RDS 135.

One or more routers wishing to receive shared routes register with RDS 135 and are provided with access to the stored routing information. The importing routers may query the database to inquire if there are any shared routes available for importation via step S150. Routers that export shared routes to RDS 135 may include routing criteria which identifies which importing routers may access the routing information in RDS 135. Likewise, the importing routers may include specific route specifications that the importing routers include in their request to RDS 135 for routing information. These specifications identify certain allowable routes or certain qualifying exporting routers 130.

RDS 135 includes a processor that determines, via step S155, if the route specifications included in the request from the importing routers for available shared routes match any of the stored routes that reside in the database. If there is no match, RDS 135 may send a response back to each inquiring router, informing them that there are no available shared routes matching their route export criteria. Or, RDS 135 may simply wait until further requests arrive from the importing routers that include routing specification criteria matching one or more stored routes via step S160. If there exist stored routes that match the importing router's criteria, these routes are forwarded to the appropriate importing routers via step S165.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product which comprises all the features enabling the implementation of the methods described herein and which, when loaded in a computing system, is able to carry out these methods. Storage medium refers to any volatile or non-volatile storage device.

Computer program or application in the present context means any expression, in any language, code or notation, of a set of instructions intended to cause a system having an information processing capability to perform a particular function either directly, or after either or both of the following: (a) conversion to another language, code or notation; and (b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be made to the following claims, rather than to the foregoing specification, as indicating the scope of the invention.

I claim:

1. A method for leaking routes among routers in a communication network, the method comprising:
   receiving routing information from one or more exporting routers, the received routing information including:
      one or more routes to be shared; and
      route importing criteria for each route, the route importing criteria including a policy received from at least one of the exporting routers that restricts specific requesting routers from receiving exported shared routes and permits specific requesting routers to receive the exported shared routes;
   storing the received routing information in a database accessible by more than one requesting router;
   receiving from one or more requesting routers a request for one or more shared routes;
   determining whether the request for the one or more shared routes matches the route importing criteria;
   providing, only upon receipt of the request, one or more shared routes to the one or more requesting routers that are not restricted from receiving exported shared routes according to the policy received from the at least one exporting router; and
   providing, only upon receipt of the request, the one or more shared routes to the one or more requesting routers that are permitted to receive the exported shared routes according to the policy received from the at least one exporting router.

2. The method of claim 1, wherein the route importing criteria identifies the specific requesting routers that are permitted to receive the exported shared routes.

3. The method of claim 1, wherein the request for one or more shared routes includes shared routes specifications that identify one or more of specific routes or specific exporting routers.

4. The method of claim 3, further comprising notifying a requesting router when shared routes that match the requesting router's shared route specifications become available.

5. The method of claim 1, wherein the requesting routers can query the database on demand to determine if any shared routes are available.

6. The method of claim 1, wherein at least one of the routers is a virtual router.

7. A system for leaking routes among requesting and exporting routers in a communication network, the system comprising:
   one or more routers;
   a route distribution service for receiving routing information from one or more exporting routers, the received routing information including:
      one or more shared routes; and
      route importing criteria for each route, the route importing criteria including a policy received from at least one of the exporting routers that restricts specific requesting routers from receiving exported shared routes and permits specific requesting routers to receive the exported shared routes; and
   a database for storing the received routing information, the database being accessible by more than one requesting router;
   wherein the route distribution service receives from one or more requesting routers a request for one or more shared routes, determines whether the request for the one or more shared routes matches the route importing criteria, provides, only upon receipt of the request, one or more shared routes to the one or more requesting routers that are not restricted from receiving exported shared routes according to the policy received from the at least one exporting router, and provides, only upon receipt of the request, the one or more shared routes to the one or more requesting routers that are permitted to receive the exported shared routes according to the policy received from the at least one exporting router.

8. The system of claim 7, wherein the route importing criteria identifies the specific requesting routers that are permitted to receive the exported shared routes.

9. The system of claim 7, wherein the request for one or more shared routes includes shared routes specifications that identify one or more of specific routes or specific exporting routers.

10. The system of claim 9, wherein the route distribution services notifies a requesting router when shared routes that match the requesting router's shared route specifications become available.

11. The system of claim 7, wherein the requesting routers can query the database on demand to determine if any shared routes are available.

12. The system of claim 7, wherein at least one of the routers is a virtual router.

13. A non-transitory computer-readable storage medium storing a computer program which when executed by a processing unit performs a method for leaking routes among routers in a communication network, the method comprising:
   receiving routing information from one or more exporting routers, the received routing information including:
      one or more routes to be shared; and
      route importing criteria for each route, the route importing criteria including a policy received from at least one of the exporting routers that restricts specific requesting routers from receiving exported shared routes and permits specific requesting routers to receive the exported shared routes;
   storing the received routing information in a database, the database being accessible by more than one requesting router;
   receiving from one or more requesting routers a request for one or more shared routes;
   determining, by a processor, whether the request for the one or more shared routes matches the route importing criteria;
   providing, only upon receipt of the request, one or more shared routes to one or more requesting routers that are not restricted from receiving exported shared routes according to the policy received from the at least one exporting router; and
   providing, only upon receipt of the request, the one or more shared routes to the one or more requesting routers that are permitted to receive the exported shared routes according to the policy received from the at least one exporting router.

14. The non-transitory computer-readable storage medium of claim 13, wherein the route importing criteria identifies the specific requesting routers that are permitted to receive the exported shared routes.

15. The non-transitory computer-readable storage medium of claim 13, wherein the request for one or more shared routes includes shared routes specifications that identify one or more of specific routes or specific exporting routers.

16. The non-transitory computer-readable storage medium of claim 15, wherein the method further comprises notifying a requesting router when shared routes that match the importing router's shared route specifications become available.

17. The non-transitory computer-readable storage medium of claim 13, wherein the requesting routers can query the database on demand to determine if any shared routes are available.

18. The non-transitory computer-readable storage medium of claim 13, wherein at least one of the routers is a virtual router.

* * * * *